United States Patent [19]

Solhjell

[11] Patent Number: 4,803,704
[45] Date of Patent: Feb. 7, 1989

[54] CIRCUIT ARRANGEMENT FOR THE RECOGNITION OF IMPERMISSABLE PHASE ERRORS IN A PHASE LOCKED LOOP

[75] Inventor: Erik Solhjell, Oslo, Norway
[73] Assignee: Tandberg Data A/S, Oslo, Norway
[21] Appl. No.: 70,191
[22] Filed: Jul. 6, 1987

[30] Foreign Application Priority Data

Dec. 22, 1986 [DE] Fed. Rep. of Germany ....... 3643966

[51] Int. Cl.[4] .............................................. H04L 7/02
[52] U.S. Cl. ...................................... 375/120; 331/14
[58] Field of Search ..................... 375/81, 120; 329/50, 329/122; 331/1 A, 14, 17, 25; 328/155; 360/51

[56] References Cited

U.S. PATENT DOCUMENTS

| 4,517,531 | 5/1985 | Tan et al. ................... 331/14 |
| 4,563,657 | 1/1986 | Qureshi et al. .............. 331/14 |
| 4,596,963 | 6/1986 | Lawton et al. .............. 331/14 |
| 4,607,296 | 8/1986 | Smidth ........................ 360/51 |
| 4,644,567 | 2/1987 | Artun et al. ................. 375/120 |

FOREIGN PATENT DOCUMENTS 0141946 8/1984 European Pat. Off. .
0153107 8/1985 European Pat. Off. .
3115057A1 10/1982 Fed. Rep. of Germany .

OTHER PUBLICATIONS

IBM Technical Disclosure Bulletin, vol. 8, No. 12, May, 1966, "Error Feedback Clocking" by W. T. Harnett, pp. 1742–1744.

1298 Telecom. & Radio Engineering, vol. 31/32, No. 8 (1977.08) "A Synchronization System with Digital Control in High-Speed Data Transmission", by A. S. Georgiyev, pp. 22–24.

IBM Technical Disclosure Bulletin, vol. 28, No. 5, Oct. 1985, "Voter Frequency Control Loop for Global Common Clock", pp. 1986 and 1987.

*Primary Examiner*—Benedict V. Safourek
*Attorney, Agent, or Firm*—Hill, Van Santen, Steadman & Simpson

[57] ABSTRACT

In a retrieval of data stored on a magnetic medium, a phase locked loop is employed for clocking data signals allocated to the data. This phase locked loop generates clock signals synchronized with the data signals. The data signals are subject to various distortions and are subject to a shift of individual data signals dependent on the recorded data. To prevent the phase locked loop from processing these shifts as phase or frequency errors, a switch stage is provided which inhibits the control in the phase locked loop give the occurrence of such shifts. The switch stage contains a time-delay stage and a comparator. The control is inhibited when successive phase differences between the data signals and the clock signals appear in opposite directions.

7 Claims, 3 Drawing Sheets

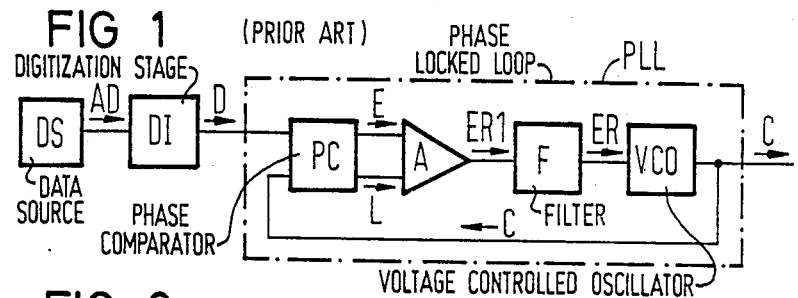
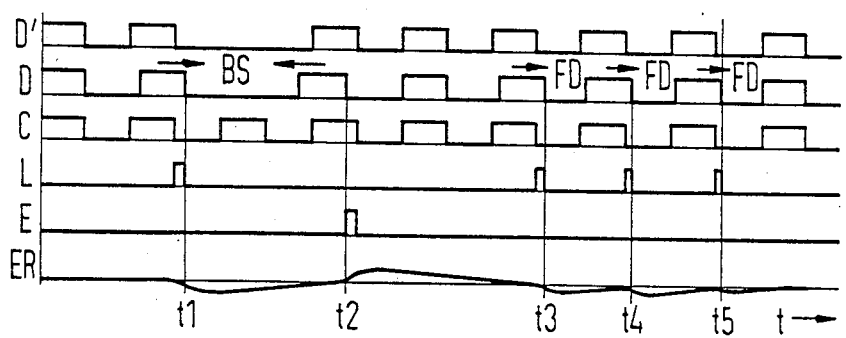
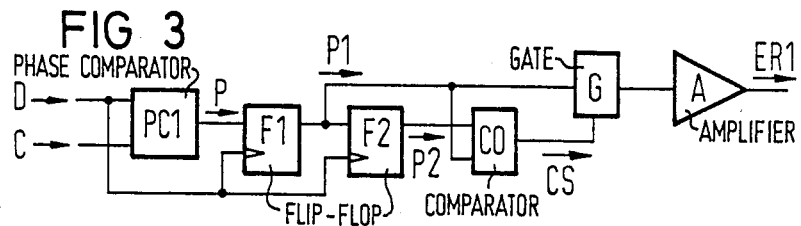
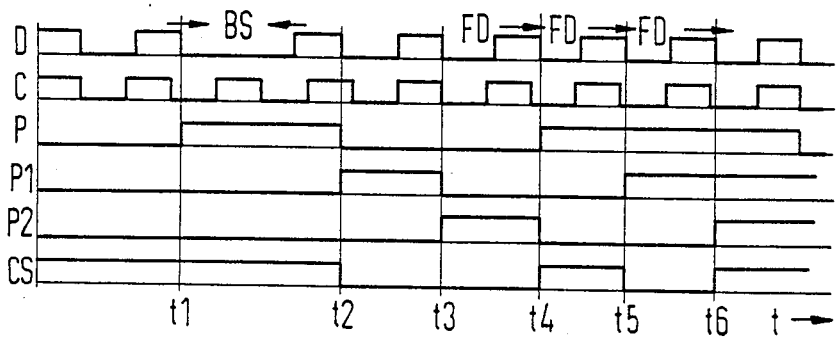

CIRCUIT ARRANGEMENT FOR THE RECOGNITION OF IMPERMISSABLE PHASE ERRORS IN A PHASE LOCKED LOOP

BACKGROUND OF THE INVENTION

1. Field of the Invention

The invention is directed to a circuit arrangement for the recognition of impermissable phase errors in a phase locked loop wherein means are provided for generating phase signals by a phase comparison of binary data signals and clock signals and wherein a repetition rate of clock signals generated in an oscillator is modified dependent on the phase signals.

2. Description of the Prior Art

In a playback of data recorded on a recording medium, for example on a magnetic tape or on a magnetic disk, the data signals output by a transducer, for example, a magnetic head, can be distorted in various ways. The distortions can occur as a result of fluctuations in the relative speed between the recording medium and the transducer. This can occur due to noise, dust particles, inadequacies in the surface of the recording medium, or, in the case of a magnetic recording medium, due to the particular properties of the magnetic particles. In order to assure the best possible playback of the data stored by the data signals, a phase locked loop, also referred to as a PLL, is employed in order to generate lock signals which are synchronized with the played back data signals. The phase locked loop can be designed both as an analog as well as a digital circuit.

Such a phase locked loop designed as an analog circuit is shown in FIG. 1. The analog data signals AD proceed from a data source DS, for example, a magnetic head of a magnetic tape recorder means or of a magnetic disk storage, to a digitization stage DI which generates binary data signals D from the analog data signals. These data signals D are supplied to the phase locked loop PLL which generates clock signals C serving as reference clock signals. The clock signals C are generated in a voltage-controlled oscillation VCO and, just like the data signals D, are supplied to a phase comparator PC. Dependent upon whether the data signals D lead or trail the clock signals C, this generates phase signals E or L whose duration corresponds to the amount of lead or trail. An amplifier A generates an error signal ER1 from these phase signals EL and conducts it to a filter F, usually a low-pass filter, which generates a control signal ER and emits this to the voltage-controlled oscillator VCO. This modifies the frequency of the clock signals C dependent on the momentary value of the control signal ER such that a phase difference between the data signals D and the clock signals C is opposed.

In the illustration of FIG. 2, the data signals D' are ideal data signals wherein the spacings of the leading edges differ by whole-numbered factors dependent on the data to be recorded.

It can occur in a recording onto a recording medium that successive data signals D are shifted in opposite directions. This particularly occurs when the spacings of the data signals change and the data signals D are then respectively shifted toward the gap which thus arises. This event is also referred to as "bit shift" and is identified as BS in FIG. 2. However, it can also occur that, due for example to a fluctuation in the relative speed between the recording medium and the transducer, the data signals D are shifted in one direction, this then being referred to as a frequency deviation and being identified as FD in FIG. 2.

In both cases, the phase locked loop PLL has the job of eliminating the influences of these effects. Given a frequency deviation FD, there is no difficulty in modifying the frequency of the clock signals C in one direction. However, there is a risk that in the first, data-dependent shift as shown, for example, at point in time T1, the oscillator VCO is adjusted in the same way as it is adjusted given a frequency deviation FD corresponding to a trailing of the data signals D. In the following data signal D as shown, for example at point in time T2, the data signal D is leading in comparison to the clock signal C. It can thus occur that the synchronization between the data signals D and the clock signals C is lost, and thus the recorded data cannot be unambiguously re-acquired.

Given a trailing of the data signals D in comparison to the clock signals C, phase signals L are generated at points in time T1 and T3 through T5, whereas a phase signal E is generated at point in time T2 given leading data signals. The amplifier A and the filter F generate the control signal ER from the phase signals E and L, this control signal ER being supplied to the oscillator VCO in order to modify the frequency of the clock signal C to assure the best possible synchronization between the clock signals C and the data signals D.

The filter F is normally in position to compensate the data dependent bit shifts BS. However, given storages of which especially high demands are made, it can occur that the elimination of the information-dependent bit shifts is extremely difficult without disturbing the high-frequency behavior of the phase locked loop PLL.

SUMMARY OF THE INVENTION

It is therefore an object of the invention to specify a circuit arrangement which eliminates the influences of impermissable phase errors as a consequence of data-dependent shifts without disturbing the high-frequency behavior of the phase locked loop.

According to the invention, a switching means is provided for identifying a phase difference between two successive data signals and corresponding clock signals, for recognizing an impermissable phase error when two successive phase differences exhibit directions opposite one another, and for inhibiting said means for modifying the repetition rate of the clock signals given presence of such an impermissable phase error.

The present invention is based on the fact that the data-dependent shifts as defined here are always caused by two successive data signals being shifted in mutually opposite directions. These shifts are recognized with the assistance of a switching stage, and the control by the phase locked loop is inhibited.

BRIEF DESCRIPTION OF THE DRAWINGS

FIG. 1 is a block circuit diagram of a known phase locked loop;

FIG. 2 is a signal pattern of signals at various points of the phase locked loop illustrated in FIG. 1;

FIG. 3 is a block circuit diagram of a circuit arrangement of the invention;

FIG. 4 is a time diagram of signals at various points of the circuit arrangement shown in FIG. 3;

DESCRIPTION OF THE PREFERRED EMBODIMENTS

In the block circuit diagram shown in FIG. 3, the phase comparator PC1 corresponds to the phase comparator shown in FIG. 1 and essentially differs therefrom only in that, instead of the phase signals E and L, it only respectively outputs one phase signal P whose binary value indicates whether a data signal D is leading or trailing a clock signal C. The phase signals P are supplied to a time delay element formed of two flip-flops F1 and F2 which respectively delay the phase signals P in accordance with the spacing of the data signals D, and outputs the delayed phase signals P1 and P2. The delayed phase signals P1 and P2 are supplied to a comparator CO which outputs the control signals CS with which the phase signals P1 are inhibited when two successive, data-dependent bit shifts BS occur in opposite directions. The inhibiting occurs by means of a gate G which is connected preceding an amplifier A and which emits a control signal ER1 only when a control signal CS simultaneously occurs with the phase signal P1.

In the illustration in FIG. 4, the phase detector PC1 determines at point in times T1 that the data signal D is trailing the clock signal C and the phase signal P assumes the binary value 1. At point in time t2, the phase detector PC1 determines that the data signal D is leading the clock signal C and the phase signal P again assumes the binary value 0. Since the data signal D is supplied to the clock input of the flip-flop F1 at whose data input the phase signal P is present, the flip-flop F1 is set at point in time t2. With the trailing edge of the next data signal D, the flip-flop F1 is again reset at point in time 33 and the flip-flop F2 is set. It is assumed at point in time t4, t5, and t6 that the data signals D are trailing the clock signals C as a consequence of a frequency deviation FD. The phase signal P thus respectively assumes the binary value 1 at these points in time or retains this binary value 1. In a corresponding way, the phase signals P1 and P2 assume the binary value 1 with the respectively following data signals D.

Between points in time t2 and t4, the comparator CO inhibits the phase signals P1 since these are allocated to mutually opposite phase shifts. Up to point in time t2, between points in time t4 and t5, and following point in time t6, the phase signals P1, however, are connected through as control signals ER1 in order to maintain the synchronization between the data signals D and the clock signals C. A control signal CS for inhibiting the gate G is always output when the phase signals P1 and P2 exhibit the same binary value. For this purpose, for example, the comparator CO can be designed as an equivalence gate. The gate G, for example, can be designed as a tristate gate wherein the output is switched to high-resistance by the control signal CS and is always enabled by the control signal CS only when no data-dependent shift of the data signals D occur.

Figure 5:
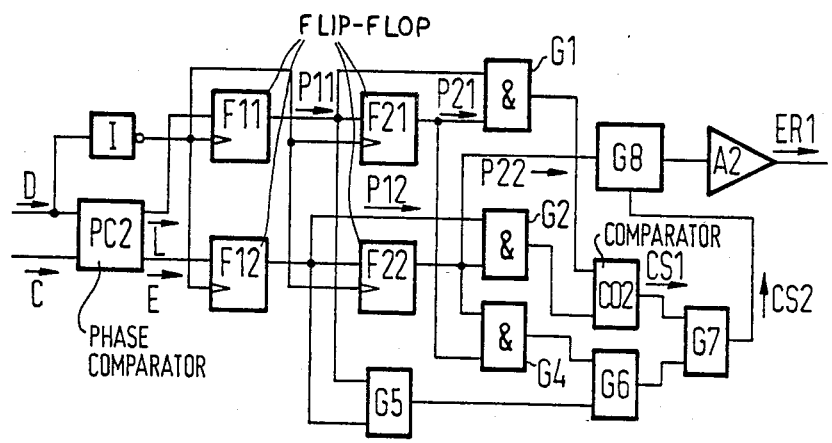
FIG. 5 is a circuit diagram of an embodiment of the circuit arrangement of the invention.

The circuit diagram shown in FIG. 5 shows a more detailed illustration of the circuit arrangement of FIG. 3. In this circuit diagram, the phase comparator PC2 has two outputs in accordance with the block circuit diagram in FIG. 1 at which the phase signals E and L are output. Each of the phase signals E or L is delayed by two period durations of the data signals D in a two stage time-delay element formed of flip-flops F11, F12, F21, and F22. For this purpose, the clock inputs of the flip-flops are supplied with the data signals D inverted by an inverter I. A phase signal L is output when a data signal D trails a clock signal C and a phase signal E is output when a data signal D leads a clock signal C. Gates G1 through G3 check whether the delayed phase signals P11 and P21 or P12 and P22 are identical. Further gates G4, G5, and G6 check whether impermissable conditions of the flip-flops F11 through F22 occur when the phase signals L and E appear simultaneously. In this case, a gate G7 prevents the phase signal P22 from being connected through to the amplifier A2 via the gate GB, and from being output at the amplifier A2 as a control signal ER1. In case no impermissable conditions occur, a control signal CS1 output at the gate G3 is supplied to the gate G8 as control signal CS2 via the gate G7. This control signal CS2 always inhibits the gate G8 when successive phase shifts appear in opposite directions, and thus data-dependent shifts of the data signals D are indicated. The control signal CS2 can also be synchronized by a further flip-flop in order to avoid noise peaks on the signal supplied to the amplifier A2.

Figure 6:
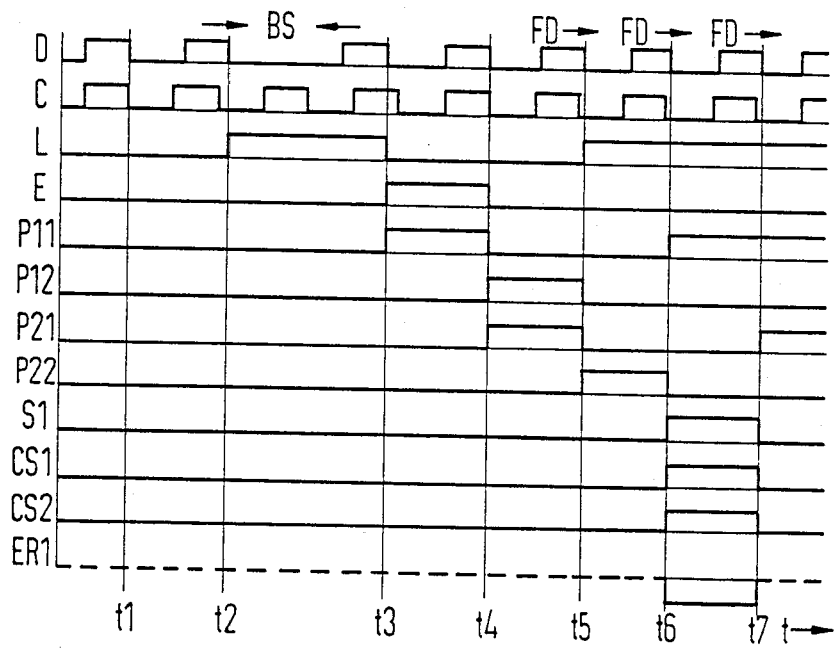
FIG. 6 shows time diagrams of signals at various points of the circuit arrangement of FIG. 5.

The time diagram shown in FIG. 6 differs from the time diagram shown in FIG. 4 since first, the two phase signals L and E are generated instead of one phase signal P. It is assumed that the data signal D is leading the clock signal C at point in time t1, is trailing it at points in time t4 and t5, and is in-phase at points in time t6 and t7. The data-dependent bit shift BS of the data signals D occurs at points in time t2 and t3. In a way corresponding to that in FIG. 4, the phase signals L and E are each delayed by two period durations of the data signals D. Since the phase shifts between the data signals and the clock signals C occur in the same direction only at points in time t4 and t5, a corresponding control signal ER1 is output only between the points in time t6 and t7. Given successive, mutually oppositely directed phase shifts BS between the data signals D and the clock signal C, the circuit arrangement shown in FIG. 5 inhibits the control by the phase locked loop PLL.

Given the circuit diagram shown in FIG. 5, the phase comparator PC2 is designed such that it stores the phase signals L and E up to the respective appearance of the next data signal D. It is also possible to employ a phase comparator PC2 wherein, as shown in FIG. 2, the phase signals L and E each comprise a duration which corresponds to the phase error. These pulses are converted into a corresponding voltage which is sensed and stored until they are switched through by the gate G8 while the control signal CS2 is active.

Figure 7:
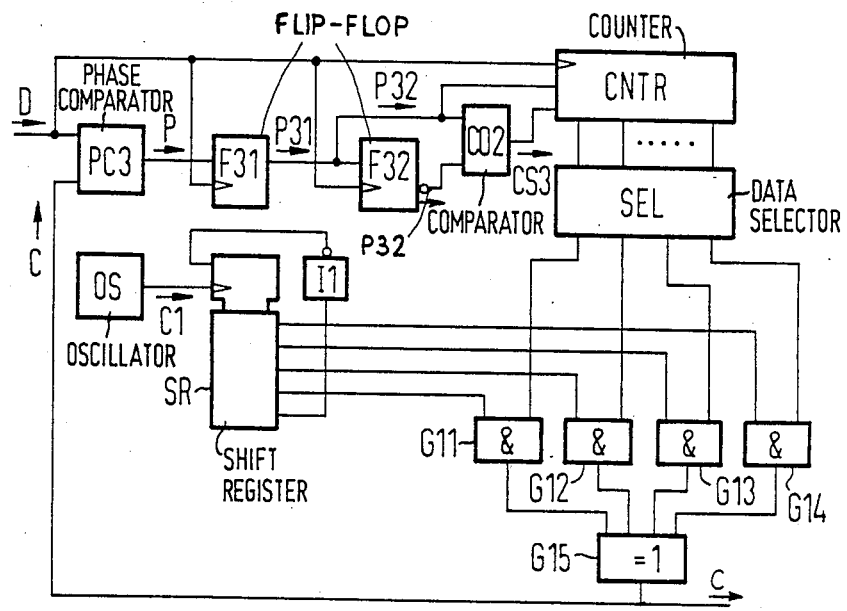
FIG. 7 is an exemplary embodiment of a circuit arrangement provided in a digital phase locked loop in accordance with the invention.

The circuit arrangement of the invention can also be employed in a completely digitalized phase locked loop. Various solutions are possible therefor. A relatively simple solution is shown in FIG. 7. The data signals D and the clock signals C are again supplied to a phase comparator PC3 which generates a phase signal P between a respective data signal D and a clock signal C. The phase signals P are each delayed by a period duration of the data signals D by two flip-flops F31 and F32 and are checked by an equivalence gate serving as comparator CO2 to see whether the data signals P31 and P32 exhibit an unequal binary value, and thus indicate phase shifts BS in mutually opposite directions.

Instead of the voltage-controlled oscillator VCO, an oscillator OS is provided in this digitalized control circuit which outputs clock signals C1 having a relatively high repetition rate to a shift register SR and is fed back by an inverter I1. The parallel outputs of the shift register SR are each connected to an input of AND gates G11 through G14 whose outputs are each supplied to an OR gate G15. The clock signals C are output at the output of the OR gate G15.

The shift register SR serves as a frequency divider wherein a respective output signal at one output is slightly delayed in comparison to an output signal at a preceding output. A data selector SEL selects one of the gates G11 through G14 in order to supply the corresponding output signal of the shift register SR to the phase comparator PC3 as clock signal C via the OR gate G15. The data selector SEL is driven by a counter CNTR at whose clock input the data signals D are present, at whose increment/deincrement control input the phase signal P31 is present, and at whose enable input the output signal of the comparator CO2 is present. Dependent on the binary value of the phase signal P31, the counter is incremented or deincremented with every data signal D depending upon whether a leading or a trailing of a data signal D in comparison to a clock signal C is to be opposed. The incrementing/deincrementing of the counter CNTR, however, occurs only when the comparator CO2 emits an enable signal, i.e. when the phase differences between two successive data signals D and the corresponding clock signals C exhibit the correct direction. In case the phase differences of the successive data signals D exhibit different directions, the counter CNTR is inhibited in order to guarantee a faultless synchronization between the data signals D and the clock signals C.

Although various minor changes and modifications might be proposed by those skilled in the art, it will be understood that I with to include within the claims of the patent warranted hereon all such changes and modifications as reasonably come within my contribution to the art.

I claim as my invention:

1. A phase-locked loop circuit arrangement for recognition of impermissable phase errors in binary data signals fed to the phase-locked loop, comprising:
   an oscillator means for generating clock signals;
   means for generating phase signals indicating phase differences between said binary data signals and said clock signals by a phase comparison;
   means connected to a control input of said oscillator means for modifying a repetition rate of said clock signals dependent on said phase signals; and
   a switching means connected to receive said binary data signals and said phase signals for recognizing impermissable phase errors when two successive phase differences between said binary data signals and said clock signals have directions opposite one another, and for inhibiting said means for modifying the repetition rate of said clock signals given presence of said impermissable phase errors.

2. A circuit arrangement according to claim 1 wherein the switching means has a time-delay means for delaying the phase signals by a respective cycle time of the binary data signals and for outputting second and third phase signals delayed by a cycle time with respect to one another, and a comparator means connected to the time delay means for comparing the second and third phase signals.

3. A circuit arrangement according to claim 2 wherein the time delay means is formed of two clock-controlled flip-flops.

4. A circuit arrangement according to claim 3 wherein the comparator means is formed of an equivalence gate having an output connected to said means for modifying.

5. A circuit arrangement according to claim 2 wherein a filter is arranged between said means for generating phase signals and said oscillator means, and said switching means inhibiting control of the phase locked loop by inhibiting a transmission of said second phase signals to said filter.

6. A circuit arrangement according to claim 1 wherein said switching means inhibits said means for modifying the repetition rate of the clock signals by inhibiting an analog control signal generated by said switching means and supplied to the oscillator means.

7. A method for recognition of impermissable phase differences in binary data signals fed to a phase locked loop, comprising steps of:
   generating clock signals;
   generating phase signals by a phase comparison of said binary data signals and said clock signals;
   modifying a repetition rate of said clock signals dependent on said phase signals; and
   recognizing impermissable phase errors when two successive phase differences between said binary data signals and said clock signals exhibit directions opposite one another, and inhibiting the modification of the repetition rate of the clock signals given presence of such impermissable phase errors.

* * * * *